(12) United States Patent
Carrillo et al.

(10) Patent No.: US 9,018,342 B2
(45) Date of Patent: Apr. 28, 2015

(54) POLY(PHENYLENE ETHER) COPOLYMER AND METHOD OF MAKING

(75) Inventors: Alvaro Carrillo, Delmar, NY (US); Scott Michael Fisher, Delmar, NY (US); Hua Guo, Beijing (CN); Stephan Moyses, Albany, NY (US); Eylem Tarkin-Tas, Delmar, NY (US)

(73) Assignee: Sabic Global Technologies B.V. (NL)

( * ) Notice: Subject to any disclaimer, the term of this patent is extended or adjusted under 35 U.S.C. 154(b) by 0 days.

(21) Appl. No.: 13/881,480

(22) PCT Filed: Jul. 27, 2012

(86) PCT No.: PCT/US2012/048549
§ 371 (c)(1),
(2), (4) Date: Apr. 25, 2013

(87) PCT Pub. No.: WO2013/162639
PCT Pub. Date: Oct. 31, 2013

(65) Prior Publication Data
US 2015/0038667 A1  Feb. 5, 2015

Related U.S. Application Data

(60) Provisional application No. 61/638,111, filed on Apr. 25, 2012.

(51) Int. Cl.
  *C08G 65/38* (2006.01)
  *C08G 65/44* (2006.01)
  *C08L 71/12* (2006.01)
  *C08G 65/46* (2006.01)
  *C08G 65/40* (2006.01)

(52) U.S. Cl.
  CPC ............ *C08G 65/44* (2013.01); *C08G 65/38* (2013.01); *C08L 71/12* (2013.01); *C08G 65/46* (2013.01)

(58) Field of Classification Search
  USPC .................... 528/86, 211, 212, 215
  See application file for complete search history.

(56) References Cited

U.S. PATENT DOCUMENTS

| 3,292,061 A | 12/1966 | Eustance |
| 3,306,875 A | 2/1967 | Hay |
| 3,392,147 A | 7/1968 | Borman |
| 3,573,257 A | 3/1971 | Nakashio et al. |
| 3,733,299 A * | 5/1973 | Cooper et al. ............... 528/215 |
| 3,787,361 A | 1/1974 | Nakashio et al. |
| 5,109,069 A | 4/1992 | Shibata et al. |
| 6,323,300 B1 | 11/2001 | Kita et al. |
| 7,282,554 B2 | 10/2007 | Mitsui et al. |
| 7,910,686 B2 | 3/2011 | Shinoda et al. |
| 2008/0076884 A1 | 3/2008 | Yeager et al. |

FOREIGN PATENT DOCUMENTS

| JP | 10168179 | 6/1998 |
| JP | 10168180 | 6/1998 |
| JP | 10168181 | 6/1998 |
| JP | 11322921 | 11/1999 |
| JP | 2006057079 A | 3/2006 |
| JP | 2006335806 A | 12/2006 |
| JP | 2007045944 A | 2/2007 |
| WO | WO 2008-036454 * | 3/2007 |
| WO | 2008036454 A1 | 3/2008 |

OTHER PUBLICATIONS

International Search Report and Written Opinion; International Application No. PCT/US2012/048549; International Filing Date Jul. 27, 2012; Date of Mailing Feb. 25, 2013; 8 pages.

* cited by examiner

*Primary Examiner* — Terressa Boykin
(74) *Attorney, Agent, or Firm* — Cantor Colburn LLP

(57) ABSTRACT

A poly(phenylene ether) copolymer comprises about 5 to 40 mole percent repeat units derived from 2-phenylphenol and 60 to about 95 mole percent repeat units derived from 2,6-dimethylphenol, wherein the poly(phenylene ether) copolymer has a weight average molecular weight of at least 8,000 atomic mass units, as measured by gel permeation chromatography. A method of preparing the poly(phenylene ether) copolymer, comprises oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst comprising a metal ion and at least one amine ligand to form a solution of the poly(phenylene ether) copolymer in the solvent, wherein a ratio of total moles of 2-phenylphenol and 2,6-dimethylphenol to moles of metal ion is about 10:1 to about 1200:1.

8 Claims, 5 Drawing Sheets

POLY(PHENYLENE ETHER) COPOLYMER AND METHOD OF MAKING

CROSS REFERENCE TO RELATED APPLICATIONS

This is a U.S. national stage of application No. PCT/US2012/048549, filed on 27 Jul. 2012, which claims the benefit of priority to U.S. provisional patent application No. 61/638,111, filed 25 Apr. 2012, the disclosures of which are incorporated herein by reference.

BACKGROUND OF THE INVENTION

Poly(phenylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(phenylene ether)s with various other plastics in order to meet the requirements of a wide variety of consumer products, for example, plumbing fixtures, electrical boxes, automotive parts, and insulation for wire and cable.

Another use of poly(phenylene ether) is in the fabrication of solar thermal collectors. Solar thermal collectors are designed to absorb sunlight and convert it to thermal energy that can be used to heat buildings and to generate hot water at reduced cost. In general, polymer-based solar collectors are much less expensive than conventional copper flat plate collectors, and are therefore cost-effective even in regions where energy is relatively inexpensive. Extremely high temperatures can be realized in solar collectors, especially when heat transfer fluid is not present or is not circulating. Solar collectors comprise solar panels, solar connectors, and junction boxes. Solar connectors and junction boxes can operate at temperatures as high as 85° C., and solar panels can operate at temperatures as high as 140° C. The current maximum continuous use temperature for the most common poly(phenylene ether), poly(2,6-dimethyl-1,4-diphenylene ether) is about 125° C. Prolonged exposure to these high temperatures can accelerate oxidative degradation of the poly(phenylene ether), which can be accompanied by a loss of the physical properties which make it suitable for use in this application. Thus there remains a need in the art for poly(phenylene ether)s having increased resistance to thermal and oxidative degradation.

Japanese Unexamined Patent Publication JP 11-322921 of Kita et al. generally discloses a copolymer formed by oxidative copolymerization of 2-methylphenol and a second monohydric phenol than can be, among others, 2,6-dimethylphenol. However, there are no examples of copolymers of 2-phenylphenol and 2,6-dimethylphenol. Kita also discloses copolymers comprising 50-100 weight percent of 2-phenylphenol units and 0-50 weight percent of monohydric phenol units. When the monohydric phenol is 2,6-dimethylphenol, the weight ratios of Kita correspond to 41.8 to 100 mole percent of 2-phenylphenol. However, 2-phenylphenol is more expensive than 2,6-dimethylphenol, and the copolymers of Kita will be significantly more expensive to produce than poly(2,6-dimethyl-1,4-phenylene ether). Thus there remains a need in the art for poly(phenylene ether) copolymers having a good balance of thermal and oxidative stability and reduced cost.

BRIEF SUMMARY OF EMBODIMENTS OF THE INVENTION

One embodiment is a poly(phenylene ether) copolymer comprising about 5 to 40 mole percent repeat units derived from 2 phenylphenol and 60 to about 95 mole percent repeat units derived from 2,6 dimethylphenol, wherein the poly(phenylene ether) copolymer has a weight average molecular weight of at least 8,000 atomic mass units.

Another embodiment is a method of preparing a copolymer of 2-phenylphenol and 2,6-dimethylphenol, the method comprising oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst comprising a metal ion and at least one amine ligand to form a solution of the poly(phenylene ether) copolymer in the solvent, wherein a ratio of total moles of 2-phenylphenol and 2,6-dimethylphenol to moles of metal ion is about 10:1 to about 1200:1.

Another embodiment is a poly(phenylene ether) copolymer formed by a method comprising oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst comprising a metal ion and at least one amine ligand to form a solution of the poly(phenylene ether) copolymer in the solvent, wherein a ratio of total moles of 2-phenylphenol and 2,6-dimethylphenol to moles of metal ion is about 10:1 to about 1200:1.

These and other embodiments are described in detail below.

DETAILED DESCRIPTION OF THE INVENTION

Figure 1:
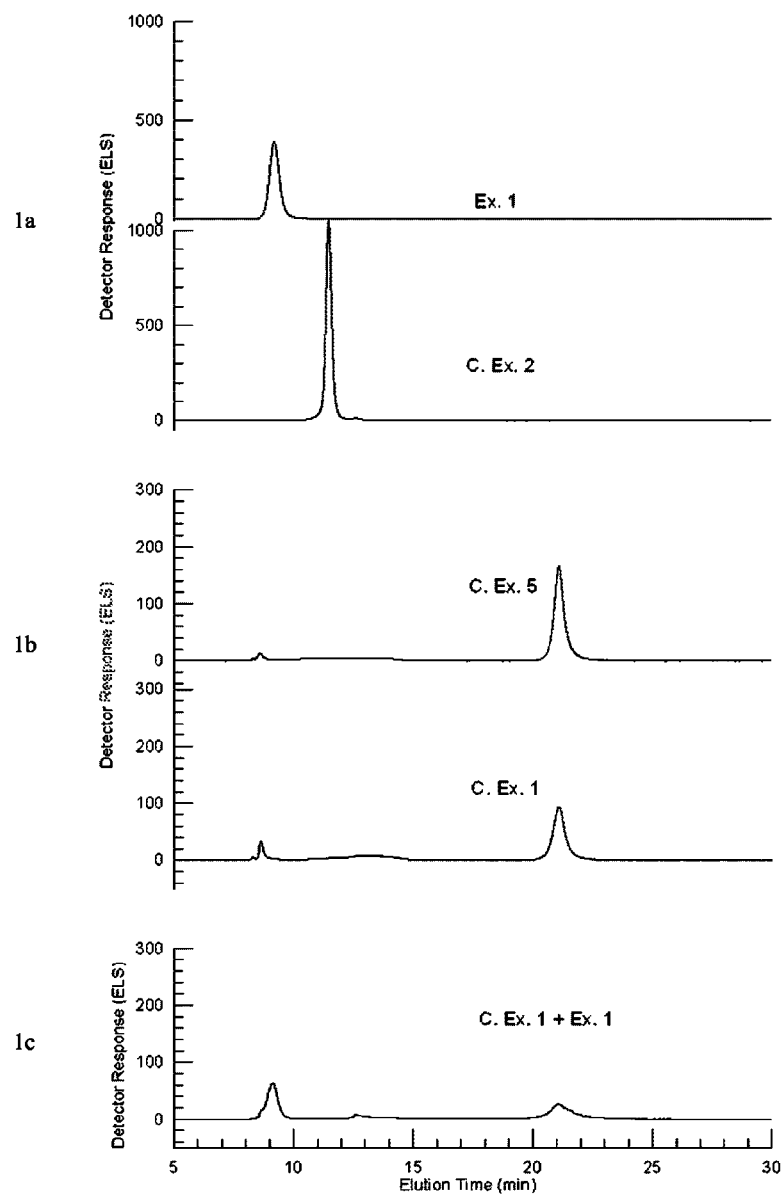
FIG. 1 depicts the gradient partition elution chromatography chromatographs of Example 1 and Comparative Example 2, overlaid (1a); of Comparative Example 2 and commercially available poly(2,6-dimethyl-1,4-phenylene ether), overlaid (1b); and of a mixture of Example 1 and Comparative Example 1 (1c).

The present inventors have determined that poly(phenylene ether) copolymers exhibiting a good balance of heat resistance, oxidative resistance, and cost can be prepared by oxidatively copolymerizing a monomer composition comprising specific amounts of 2,6-dimethylphenol and 2-phenylphenol. The increased oxidative resistance is manifested as a reduced oxygen uptake rate, and the increased heat resistance is manifested by an increased residual weight after exposure to elevated temperatures under nitrogen. Oxidative polymerization of 2,6-dimethylphenol and 2-phenylphenol results predominantly in copolymers of 2,6-dimethylphenol and 2-phenylphenol rather than homopolymers of 2,6-dimethylphenol, despite the higher 2,6-dimethylphenol content in the comonomer mixture. Moreover, the poly(phenylene ether) copolymers can be prepared with high molecular weight, and the end groups are enriched in 2-phenylphenol.

The a poly(phenylene ether) copolymer comprises about 5 to 40 mole percent repeat units derived from 2-phenylphenol and 60 to about 95 mole percent repeat units derived from 2,6-dimethylphenol. 2-Phenylphenol is distinguished from 2,6-dimethylphenol in part by having one unsubstituted ortho position on the aromatic ring. Besides the phenolic hydroxyl group, 2-phenylphenol can react at either the ortho or para positions of the phenyl ring with another phenolic monomer, as indicated in the structure to the left below. In contrast, 2,6-dimethylphenol does not have an unsubstituted ortho position. Besides the phenolic hydroxyl group, it can only react in the para position with another phenolic monomer, as indicated in the structure to the right below.

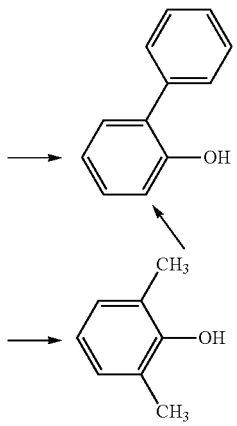

Thus the repeat units derived from 2-phenylphenol can have the structure

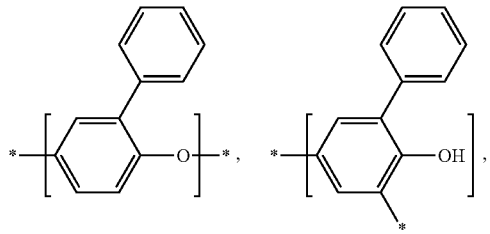

or a combination thereof; and the repeat units derived from 2,6-dimethylphenol comprise repeat units having the structure

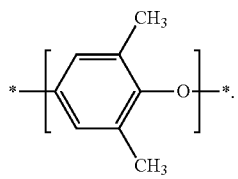

In a copolymer, the mole percent of either comonomer in head units is generally expected to be the same as the mole percent of either comonomer repeat units in the copolymer as a whole. However the present inventors have determined that the head units of the poly(phenylene ether) copolymer are enriched in 2-phenylphenol relative to the amount of 2-phenylphenol repeat units in the poly(phenylene ether) copolymer as a whole. Thus, in some embodiments, the poly(phenylene ether) copolymer comprises a mole percent of 2-phenylphenol head units based on 100 mole percent total 2-phenylphenol head units and 2,6-dimethylphenol head units, and a total mole percent of 2-phenylphenol repeat units, based on 100 mole percent total 2-phenylphenol repeat units and 2,6-dimethylphenol repeat units, wherein the mole percent of 2-phenylphenol head units is greater than the total mole percent of 2-phenylphenol repeat units.

The poly(phenylene ether) copolymer can comprise a ratio of mole percent 2-phenylphenol head units to total mole percent of 2-phenylphenol repeat units of about 1.1:1 to about 2:1. Within this range, the ratio of mole percent 2-phenylphenol head units to total mole percent of 2-phenylphenol repeat units can be about 1.15:1 to about 1.8:1, and specifically about 1.2:1 to about 1.6:1.

The total mole percent of 2-phenylphenol repeat units can be determined by $^1$H NMR spectroscopy. The mole percent of 2-phenylphenol head units based on 100 mole percent total 2-phenylphenol head units and 2,6-dimethylphenol head units can be determined by Fourier transform infrared spectroscopy (FTIR). Procedures for measuring the total mole percent of 2-phenylphenol units and the mole percent of 2-phenylphenol terminal units are provided in the examples below. 2,6-Dimethylphenol terminal units and 2-phenylphenol terminal units can be present as either head units or tail units as defined in the structures below:

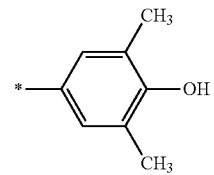
Head Unit

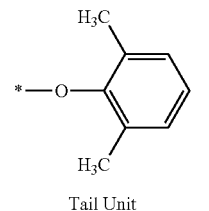
Tail Unit

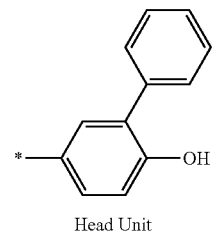
Head Unit

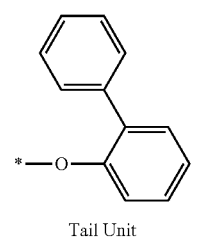
Tail Unit

The FTIR method is based on measurement of the amount of phenolic hydroxyl groups in the poly(phenylene ether)

copolymer. Since only head units comprise phenolic hydroxyl groups, the mole percent of 2-phenylphenol terminal units as defined herein is the mole percent of 2-phenylphenol head units, and is based on 100 mole percent total 2-phenylphenol head units and 2,6-dimethylphenol head units.

In any copolymerization, there is the possibility that substantial amounts of homopolymer of any of the comonomers can be produced. The inventors have determined that the composition formed by oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst can be essentially free of 2-phenylphenol homopolymer and 2,6-dimethylphenol homopolymer. Thus, the total amount of 2-phenylphenol homopolymer and 2,6-dimethylphenol homopolymer in the composition can be less than 2 weight percent, based on the total weight of the composition. Within this range, the total amount of 2-phenylphenol homopolymer and 2,6-dimethylphenol homopolymer can be less than 1 weight percent, specifically less than 0.5 weight percent, and more specifically, less than 0.1 weight percent, based on the total weight of the composition.

The poly(phenylene ether) copolymer can have a weight average molecular weight of at least 8,000 atomic mass units, specifically 8,000 to about 200,000 atomic mass units. Within this range, the poly(phenylene ether) copolymer can have a weight average molecular weight of at least about 20,000 atomic mass units, specifically at least about 40,000 atomic mass units, more specifically at least about 60,000 atomic mass units, and still more specifically at least about 80,000 atomic mass units. Also within this range, the poly(phenylene ether) copolymer can have a weight average molecular weight of less than or equal to about 150,000 atomic mass units, and specifically less than or equal to about 100,000 atomic mass units. In some embodiments, the poly(phenylene ether) copolymer has a weight average molecular weight of about 20,000 to about 200,000 atomic mass units. Weight average molecular weights were determined by gel permeation chromatography (GPC) in chloroform using polystyrene standards, and the polystyrene molecular weights were converted to poly(2,6-dimethyl-1,4-phenylene ether) molecular weights using the formula: $M(PPE)=0.3122 \times M(PS)^{1.073}$, where M(PPE) is poly(2,6-dimethyl-1,4-phenylene ether) molecular weight and M(PS) is polystyrene molecular weight.

The poly(phenylene ether) copolymer can be essentially free of covalently bound monoamine groups. "Essentially free of covalently bound monoamine groups" as used herein, signifies that the amount of covalently bound monoamine groups is less than or equal to 0.1 mole percent, based on a total of 100 mole percent of 2-phenylphenol and 2,6-dimethylphenol repeat units. The amount of covalently bound monoamine groups can be determined by proton nuclear magnetic resonance spectroscopy ($^1$H NMR). In general, a poly(phenylene ether) which is formed by oxidative polymerization in the presence of a monoamine ligand can comprise polymer molecules having terminal and internal repeat units having aminomethyl groups formed by reaction of the monoamine ligand with the methyl groups on the polymer molecule. The aminomethyl groups, when present in terminal repeat units, are located ortho to the hydroxy group. For example, when the monoamine is di-n-butylamine, the terminal repeat units can have the following structure

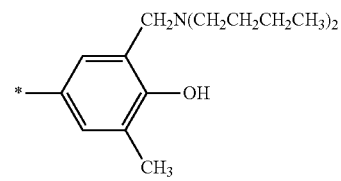

and the internal repeat units can have the following structure

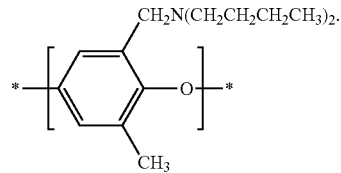

FIG. 2c depicts the $^1$H NMR spectrum in the region from about 12 to about 3.7 parts per million for a commercial poly(2,6-dimethyl-1,4-phenylene ether) (Comparative Example 5). The peak at about 3.63 parts per million is attributed to aminomethyl group protons on terminal 2,6-dimethylphenol units and the peak at about 3.36 parts per million is attributed to aminomethyl group protons on internal 2,6-dimethylphenol repeat units. Based on integration of the peak areas, the amount of terminal aminomethyl groups is about 0.42 mole percent, and the amount of internal aminomethyl groups is about 0.14 mole percent, based on a total of 100 mole percent of monomer repeat units. Now with reference to FIGS. 2a and 2b, which depict the $^1$H NMR spectra of Comparative Examples 7 and 6, respectively, there are no peaks at or about 3.63 and 3.36 parts per million for either example. Therefore, depending upon the amount of repeat units derived from 2-phenylphenol in the poly(phenylene ether) copolymer, the amount of covalently bound monoamine groups can be less than or equal to 0.1 mole percent, specifically less than or equal to 0.05 mole percent, more specifically less than or equal to 0.01 mole percent, still more specifically less than or equal to 0.005 mole percent, and even more specifically, less than or equal to 0.001 more percent, based on a total of 100 mole percent of 2-phenylphenol and 2,6-dimethylphenol repeat units.

The poly(phenylene ether) copolymers of the present invention can be prepared by oxidatively copolymerizing about 5 to 40 mole percent 2-phenylphenol and 60 to about 95 mole percent 2,6-dimethylphenol in the presence of a solvent, molecular oxygen, and a polymerization catalyst. The polymerization catalyst can be a catalyst known for the oxidative polymerization of phenols. For example, the polymerization catalyst can comprise a metal ion and at least one amine ligand. The polymerization catalyst can be prepared in situ by mixing a metal ion source (e.g., cuprous oxide and hydrobromic acid) and the amine ligands. The aromatic hydrocarbon solvent can be benzene, toluene, xylenes, mesitylene, chlorobenzene, dichlorobenzenes, chloroform, or mixtures thereof. In some embodiments, the poly(phenylene ether) solvent comprises toluene. The molecular oxygen can be provided, for example, in a purified form, or as air.

Metal ions for the preparation of the poly(phenylene ether) copolymers can comprise at least one heavy metal ion such as a copper, manganese or cobalt. Metal salts which can serve as sources of catalyst metal ions include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Instead of direct addition of any of the above-exemplified metal salts, it is also possible to add a metal or a metal oxide and an inorganic acid, organic acid or an aqueous solution of such an acid and form the corresponding metal salt or hydrate in situ. For example, cuprous oxide and hydrobromic acid can be added to generate cuprous bromide in situ.

It has been found by the inventors hereof that the weight average molecular weight of the poly(phenylene ether) copolymer is inversely proportional to the ratio of total moles 2-phenylphenol and 2,6-dimethylphenol to moles metal ion, i.e. the higher the ratio, the lower the weight average molecular weight. Specifically, in order to prepare a poly(phenylene ether) copolymer having a weight average molecular weight of at least 8,000 atomic weight units, specifically 8,000 to about 200,000 atomic mass units, a ratio of total moles of 2-phenylphenol plus moles of 2,6-dimethylphenol to moles of metal ion of less than or equal to 1,200:1 must be used.

In some embodiments, the concentration of the catalyst metal ion can be such that a ratio of total moles of monomer (i.e., moles of 2-phenylphenol plus moles of 2,6-dimethylphenol) to moles of metal ion is about 10:1 to about 1,200:1. Within this range, the ratio can be about 10:1 to about 1,000:1, specifically about 20:1 to about 800:1, more specifically about 25:1 to about 600:1, still more specifically about 30:1 to about 400:1, and yet more specifically about 40:1 to about 200:1. In some embodiments, the ratio of moles of monomer to moles of metal ion is about 20:1 to about 200:1.

Suitable amine ligands include monoamines and diamines. Monoamines include dialkylmonoamines (such as di-n-butylamine, or DBA) and trialkylmonoamines (such as N,N-dimethylbutylamine, or DMBA). Diamines include alkylenediamines, such as N,N'-di-tert-butylethylenediamine, or DBEDA. Suitable dialkylmonoamines include dimethylamine, di-n-propylamine, di-n-butylamine, di-sec-butyl amine, di-tert-butylamine, dipentylamine, dihexylamine, dioctylamine, didecylamine, dibenzylamine, methylethylamine, methylbutylamine, dicyclohexylamine, N-phenylethanolamine, N-(p-methyl)phenylethanolamine, N-(2,6-dimethyl)phenylethanolamine, N-(p-chloro) phenylethanolamine, N-ethylaniline, N-butyl aniline, N-methyl-2-methylaniline, N-methyl-2,6-dimethylaniline, diphenylamine, and the like, and combinations thereof. Suitable trialkylmonoamines include trimethylamine, triethylamine, tripropylamine, tributylamine, butyldimethylamine, phenyldiethylamine, and the like, and combinations thereof.

Suitable alkylenediamines include those having the formula

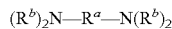

wherein $R^a$ is a substituted or unsubstituted divalent residue; and each $R^b$ is independently hydrogen or $C_1$-$C_8$ alkyl. In some examples, of the above formula, two or three aliphatic carbon atoms form the closest link between the two diamine nitrogen atoms. Specific alkylenediamine ligands include those in which $R^a$ is dimethylene (—CH$_2$CH$_2$—) or trimethylene (—CH$_2$CH$_2$CH$_2$—). $R^b$ can be independently hydrogen, methyl, propyl, isopropyl, butyl, or a $C_4$-$C_8$ alpha-tertiary alkyl group. Examples of alkylenediamine ligands include N,N,N',N' tetramethylethylene diamine (TMED), N,N'-di-tert-butylethylenediamine (DBEDA), N,N,N',N'-tetramethyl-1,3-diaminopropane (TMPD), N-methyl-1,3-diaminopropane, N,N'-dimethyl-1,3-diaminopropane, N,N,N'-dimethyl-1,3-diaminopropane, N-ethyl-1,3-diaminopropane, N-methyl-1,4-diaminobutane, N,N'-trimethyl-1,4-diaminobutane, N,N,N'-trimethyl-1,4-diaminobutane, N,N,N',N'-tetramethyl-1,4-diaminobutane, N,N,N',N'-tetramethyl-1,5-diaminopentane, and combinations thereof. In some embodiments, the amine ligand is selected from di-n-butylamine (DBA), N,N-dimethylbutylamine (DMBA), N,N'-di-tert-butylethylenediamine (DBEDA), and combinations thereof. The polymerization catalyst can be prepared in situ by mixing a metal ion source (e.g., cuprous oxide and hydrobromic acid) and the amine ligands.

The concentration of the amine ligands can be such that the ratio of moles of amine groups to moles of metal ion is about 1:10 to about 10:1. Within this range, the ratio can be at least about 1:5, specifically at least about 1:1, more specifically at least about 1.5:1, and still more specifically, at least about 2:1. Also within this range, the ratio can be up to about 7:1, specifically up to about 5:1, and more specifically up to about 3:1. As used herein, the moles of amine groups in the amine ligands refers to the moles of amine ligands times the number of amine nitrogen atoms in the amine ligands. For example, the moles of amine groups in alkylenediamine ligands refers to the moles of alkylenediamine ligands times the number of amine nitrogen atoms in the alkylenediamine ligand, i.e., "2".

After the termination of oxidative copolymerization, the reaction mixture can be treated with a chelating agent to remove the polymerization catalyst metal ion. Thus in some embodiments, the method of preparing the poly(phenylene ether) copolymer further comprises mixing the solution of the poly(phenylene ether) copolymer with an aqueous solution of a chelating agent to extract the metal ion from the solution of the copolymer, and separating the solution of the poly(phenylene ether) copolymer from the aqueous solution of the chelating agent. Suitable chelating agents include aminopolycarboxylic acids (such as nitrilotriacetic acid), alkylenediaminetetracarboxylic acids (such as ethylenediaminetetraacetic acid), alkali metal salts of the foregoing acids, and combinations thereof. In some embodiments, treating the reaction mixture with the chelant can be conducted for about 30 to about 120 minutes, specifically about 40 to about 90 minutes, at a temperature of about 40 to about 80° C., specifically about 50 to about 70° C. After contacting the reaction mixture with the chelating agent, an aqueous phase comprising the chelated metal ion is physically separated from the solution of the poly(phenylene ether) copolymer. The separation can be effected, for example, by gravity separation and decantation, or by liquid-liquid centrifugation.

After the termination of oxidative copolymerization, the solution comprising the poly(phenylene ether) copolymer in the solvent can be washed with washing solvents comprising a C1-C4 alcohol and water to remove the polymerization catalyst metal ion and to reduce the color of the poly(phenylene ether) copolymer. The solvent can be toluene, and the washing solvents can be methanol and water. After washing the solution of poly(phenylene ether) copolymer with the washing solvents, the resulting water-rich phase is physically separated from the solution of the poly(phenylene ether) copolymer in the solvent. The separation can be effected, for example, by gravity separation and decantation, or by liquid-liquid centrifugation.

The poly(phenylene ether) copolymers can be isolated from solution by a method such as precipitation or devolatilizing extrusion. The precipitation procedure comprises precipitating the poly(phenylene ether) copolymer by combining an antisolvent with the separated solution of the poly(phenylene ether) copolymer. Suitable antisolvents include $C_1$-$C_6$ alkanols (such as methanol, ethanol, 1-propanol, 2-propanol, 1-butanol, 1-pentanol, and 1-hexanol), $C_3$-$C_6$ ketones (such as acetone and methyl ethyl ketone), and mixtures thereof. In some embodiments, the antisolvent comprises methanol.

The invention includes at least the following embodiments.

Embodiment 1

A poly(phenylene ether) copolymer comprising about 5 to 40 mole percent repeat units derived from 2-phenylphenol and 60 to about 95 mole percent repeat units derived from 2,6-dimethylphenol, wherein the poly(phenylene ether) copolymer has a weight average molecular weight of at least 8,000 atomic mass units.

Embodiment 2

The poly(phenylene ether) copolymer of embodiment 1, wherein the repeat units derived from 2-phenylphenol have the structure

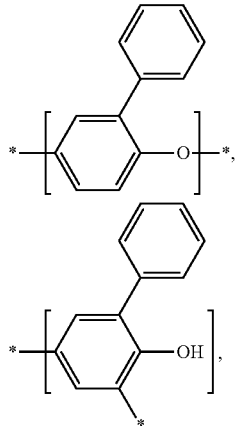

or
a combination thereof; and the repeat units derived from 2,6-dimethylphenol comprise repeat units having the structure

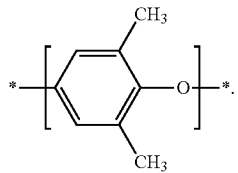

Embodiment 3

The poly(phenylene ether) copolymer of embodiment 1 or 2, comprising a mole percent of 2-phenylphenol head units based on 100 mole percent total 2-phenylphenol head units and 2,6-dimethylphenol head units, and a total mole percent of 2-phenylphenol repeat units, based on 100 mole percent total 2-phenylphenol repeat units and 2,6-dimethylphenol repeat units, wherein the mole percent of 2-phenylphenol terminal units is greater than the total mole percent of 2-phenylphenol repeat units.

Embodiment 4

The poly(phenylene ether) copolymer of embodiment 1 or 2, comprising a ratio of mole percent of 2-phenylphenol head units to total mole percent of 2-phenylphenol repeat units of about 1.1:1 to about 2:1.

Embodiment 5

The poly(phenylene ether) copolymer of embodiment 1 or 2, wherein the copolymer has a weight average molecular weight of about 20,000 to about 200,000 atomic mass units.

Embodiment 6

A poly(phenylene ether) copolymer comprising about 5 to 40 mole percent repeat units derived from 2-phenylphenol and 60 to about 95 mole percent repeat units derived from 2,6-dimethylphenol; wherein the repeat units derived from 2-phenylphenol have the structure

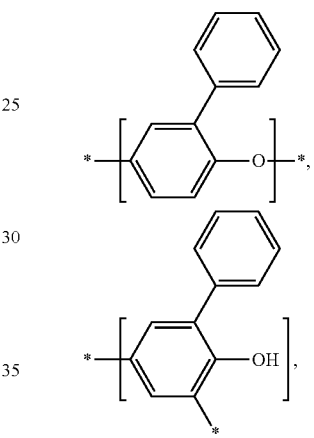

or
a combination thereof; wherein the repeat units derived from 2,6-dimethylphenol comprise repeat units have the structure

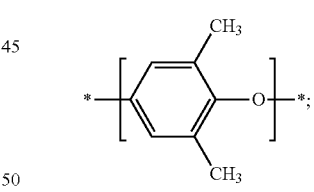

wherein the poly(phenylene ether) copolymer comprises a mole percent of 2-phenylphenol head units based on 100 mole percent total 2-phenylphenol head units and 2,6-dimethylphenol head units, a total mole percent of 2-phenylphenol repeat units, based on 100 mole percent total 2-phenylphenol and 2,6-dimethylphenol repeat units, and a ratio of the mole percent of 2-phenylphenol head units to the total mole percent of 2-phenylphenol repeat units of about 1.1:1 to about 2:1; and wherein the copolymer has a weight average molecular weight of about 20,000 to about 200,000 atomic mass units.

Embodiment 6a

The poly(phenylene ether) copolymer of claim 1, wherein the repeat units derived from 2-phenylphenol have the structure

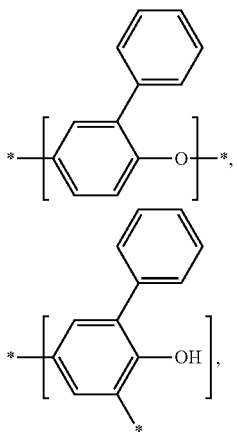

or a combination thereof; wherein the repeat units derived from 2,6-dimethylphenol comprise repeat units have the structure

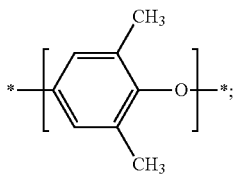

wherein the poly(phenylene ether) copolymer comprises a mole percent of 2-phenylphenol head units based on 100 mole percent total 2-phenylphenol head units and 2,6-dimethylphenol head units, a total mole percent of 2-phenylphenol repeat units, based on 100 mole percent total 2-phenylphenol and 2,6-dimethylphenol repeat units, and a ratio of the mole percent of 2-phenylphenol head units to the total mole percent of 2-phenylphenol repeat units of about 1.1:1 to about 2:1; and wherein the copolymer has a weight average molecular weight of about 20,000 to about 200,000 atomic mass units.

Embodiment 7

A method of preparing a copolymer of 2-phenylphenol and 2,6-dimethylphenol, the method comprising oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst comprising a metal ion and at least one amine ligand to form a solution of the poly(phenylene ether) copolymer in the solvent, wherein a ratio of total moles of 2-phenylphenol and 2,6-dimethylphenol to moles of metal ion is about 10:1 to about 1200:1.

Embodiment 8

The method of embodiment 7, further comprising mixing the solution of the poly(phenylene ether) copolymer in the solvent with an aqueous solution of a chelating agent, and separating the solution of the poly(phenylene ether) copolymer from the aqueous solution of the chelating agent.

Embodiment 9

The method of embodiment 8, further comprising precipitating the poly(phenylene ether) copolymer by combining an antisolvent with the separated solution of the poly(phenylene ether) copolymer in the solvent.

Embodiment 10

The method of embodiment 8, further comprising removing the solvent from the separated solution of the poly(phenylene ether) copolymer by devolatizing extrusion.

Embodiment 11

The method of any of embodiments 7-10, wherein the ratio of total moles of 2-phenylphenol and 2,6-dimethylphenol to moles of metal ion is about 20:1 to about 200:1; and wherein the ratio of moles of amine groups in the amine ligands to moles metal ion is about 1:1 to about 5:1.

Embodiment 12

A poly(phenylene ether) copolymer formed by the method of embodiment 7.

The invention is further illustrated by the following non-limiting examples.

EXAMPLES

The polymerizations were conducted in a bubbling polymerization reactor or a bubbling polymerization vessel. The bubbling polymerization reactor was a Mettler Toledo RC1e reactor, Type 3, 1.8 liters, 100 bar, equipped with a stirrer, temperature control system, nitrogen padding, oxygen bubbling tube, and computerized control system (including two RD10 controllers). There were also two separate feeding pots and pumps for dosing reactants into the reactor. The bubbling polymerization reactor was used for the polymerizations in which oxygen was the oxidant. The bubbling polymerization vessel was a 250-milliliter jacketed glass reactor, and was utilized for the polymerizations in which air was the oxidant.

TABLE 1

| Materials | |
| --- | --- |
| DBA | Di-n-butylamine |
| DBEDA | Di-tert-butylethylenediamine |
| DMBA | N,N-Dimethylbutylamine |
| DMP | 2,6-Dimethylphenol |
| QUAT | Didecyldimethyl ammonium chloride |
| NTA | Nitrilotriacetic acid |
| EDTA | Ethylenediaminetetraacetic acid |
| OPP | o-phenylphenol, or 2-phenylphenol |
| TMED | N,N,N',N'-Tetramethylethylene diamine |
| TMPD | N,N,N',N'-Tetramethyl-1,3-diaminopropane |

Number average molecular weight ($M_n$), weight average molecular weight ($M_w$), and polydispersity index D ($M_w/M_n$) were determined by gel permeation chromatography (GPC) in chloroform using polystyrene standards as follows. The gel permeation chromatograph was calibrated using twelve polystyrene standards, each of narrow molecular weight distribution, and collectively spanning a molecular weight range of 1,000 to 1,000,000 grams/mole. The columns were 1,000 and 100,000 angstrom PLgel columns and a 5 microliter 100 angstrom PLGEL guard column. Chromatography was conducted at 25° C. The elution liquid was chloroform with 100 parts per million by weight di-n-butylamine. The flow rate was 1.5 milliliters per minute. The detector wavelength was 254 nanometers. A third degree polynomial function was fitted through the calibration points. Experimental samples were prepared by dissolving 0.01 gram of homopolymer or copolymer in 20 milliliters chloroform. A 50 microliter sample of the resulting solution was injected into the chromatograph. The values of number average molecular weight ($M_a$) and weight average molecular weight ($M_w$) were calculated from the measured signal using the polystyrene calibration line. The values were subsequently converted from polystyrene molecular weights to poly(2,6-dimethyl-1,4-phenylene ether) molecular weights using the formula: $M(PPE)=0.3122 \times M(PS)^{1.073}$, where M(PPE) is poly(2,6-dimethyl-1,4-phenylene ether) molecular weight and M(PS) is polystyrene molecular weight.

Thermal gravimetric analysis (TGA) was conducted on a PERKIN ELMER PYRIS 1 THERMOGRAVIMETRIC ANALYZER from ambient temperature to 800° C. at a 10° C./minute temperature ramp. The analyses were conducted separately under nitrogen and air. All sample weights were in the range of 10.0±5 milligrams. In Table 3, "T (° C.) @ 95% wt, Air" and "T (° C.) @ 95% wt, $N_2$" refer to the temperatures of 5% weight loss under air and nitrogen, respectively. "Wt % @ 600° C., Air" and "Wt % @ 600° C., $N_2$" refer to the residual weights, in units of weight % of the original sample weights, at 600° C. under air and nitrogen, respectively.

Gradient Polymer Elution Chromatography (GPEC) was conducted using a WATERS S5 column having nitrile functionality and a solvent system of hexane/tetrahydrofuran/chloroform. The column temperature was 35° C., the injection volume was 5 microliters, the sample concentrations were 2 milligrams per milliliter in chloroform, and the elution gradient was 100% hexane to 100% tetrahydrofuran in 10 minutes immediately followed by a gradient from 100% tetrahydrofuran to 100% chloroform in 10 minutes.

Fourier transform infrared spectroscopy (FTIR) was used to measure the concentration of hydroxyl terminal units (head terminal units) from 2,6-dimethylphenol (DMP) and 2-phenylphenol (OPP) in poly(phenylene ether) copolymers. For each monomer, a calibration curve was generated by regressing the infrared absorption of the hydroxyl functional group at a specific frequency (y) versus the known hydroxyl concentration of standard solutions (x). Standard solutions were prepared from accurately weighed quantities of pure monomer (in general 0-30 milligrams and depending on the concentration range desired) dissolved in 25 milliliters of carbon disulfide. A solution cell made from low hydroxyl quartz having a 1-centimeter path length was used. The standard solution concentrations were calculated using the following formula:

$$Hydroxyl(ppm) in CalibrationSolution = MassMonomer(mg) *$$

$$MonomerPurity * \frac{1 \text{ g}}{1000 \text{ mg}} * \frac{MolecularWeightOH}{MolecularWeightMonomer} * 10^6$$

The hydroxyl absorbance was measured at 3550 inverse centimeters for OPP and at 3608 inverse centimeters for DMP, both using a two-point baseline between 3660 and 3490 inverse centimeters.

The copolymer sample solution concentration was 1 gram in 25 milliliters of carbon disulfide. The hydroxyl concentration in unknown samples was calculated from the sample weight and measured absorbance using the corresponding regression equation for that monomer. The general regression equation is given in the formula below.

$$Hydroxyl(ppm) in UnnknownSample =$$

$$\frac{\left(\frac{AbsorbanceUnknown(g) - RegressionIntercept}{RegressionSlope}\right)}{MassSample(g)}$$

Example 1

Preparation of DMP-OPP Copolymer (20 Mol % OPP) Using Air as Oxidant

Toluene (75.63 grams), 3.88 grams OPP, 0.13 gram TMED, 0.69 gram DMBA, 0.16 gram CuBr, and 3.42 grams anhydrous $MgSO_4$ were charged to a bubbling polymerization vessel and stirred under an air atmosphere. DMP (11.12 grams) and 9.36 grams toluene were added to the above reaction mixture. The temperature was maintained at 45° C., and air flow was started to the reaction vessel. Air flow was maintained for 240 minutes, at which point the flow was stopped, and 8.65 grams EDTA tetrasodium salt and 21.02 grams water were added to the reaction mixture. The resulting mixture was stirred at 60° C. for 1 hour, and the layers were then allowed to separate. The decanted light phase was precipitated in methanol, filtered, reslurried in methanol, and filtered again. The copolymer was obtained as a dry powder after drying in a vacuum oven at 110° C.

Comparative Example 1

Preparation of DMP Homopolymer Using Air as Oxidant

Toluene (81.56 grams), 0.09 gram DBA, 0.89 gram, DMBA, and 1.45 grams of a diamine mix consisting of 30 weight percent DBEDA, 7.5 weight percent QUAT, and 62.5 weight percent toluene, were charged to a bubbling polymerization vessel, and stirred under an air atmosphere. A mixture of 1.84 grams 48 weight percent aqueous HBr and 0.15 gram $Cu_2O$ was added. The temperature was maintained at 25° C. Air flow to the vessel and addition of the monomer mixture were begun at the same time. A monomer mixture consisting of 8.40 grams DMP and 9.99 grams toluene was added over 20 min. Air flow was maintained for 120 min, at which point the air flow was stopped, and a solution of 0.97 gram NTA trisodium salt and 3.91 grams water was added. The resulting mixture was stirred at 60° C. for 1 hour, and the layers were then allowed to separate. The decanted light phase was precipitated in methanol, filtered, reslurried in methanol, and filtered again. The homopolymer was obtained as a dry powder after drying in a vacuum oven at 110° C.

Comparative Example 2

Preparation of OPP Homopolymer Using Air as Oxidant

Toluene (85.00 grams), 15.00 grams OPP, 0.11 gram TMPD, 0.53 gram DMBA, 0.12 gram CuBr, and 2.64 grams anhydrous $MgSO_4$ were charged to a bubbling polymerization vessel, and then mixed under an air atmosphere. The temperature was maintained at 45° C., and air flow was started to the reaction vessel. Air flow was maintained for 240 minutes, at which point the flow was stopped and 3.35 grams EDTA tetrasodium salt and 25.73 grams water were added into the vessel. The resulting mixture was stirred at 60° C. for 1 hour, and the layers were then allowed to separate. The decanted light phase was precipitated in methanol, filtered, reslurried in methanol, and filtered again. The homopolymer was obtained as a dry powder after drying in a vacuum oven at 110° C.

Molecular weight data for Example 1 and Comparative Examples 1-2 are provided in Table 2.

Comparative Example 3

Preparation of DMP-OPP Copolymer (50 Mole % OPP)

Toluene (815.7 grams), 0.95 gram DBA, 9.18 g DMBA, and 14.8 gram of a diamine mix consisting of 30 weight percent DBEDA, 7.5 weight percent QUAT, and the balance toluene, were charged to a bubbling polymerization reactor and stirred under a nitrogen atmosphere. A mix of 18.83 gram HBr and 1.57 gram $Cu_2O$ was added. The temperature was maintained at 60° C. Oxygen flow to the vessel and addition of the monomer mixture were begun at the same time. The monomer mixture consisted of 42.6 grams DMP, 59.4 grams OPP and 101.97 grams toluene, and was added over 30 minutes. Oxygen flow was maintained for 240 minutes, at which point the oxygen flow was stopped and the reaction mixture was immediately transferred to a vessel containing 6.64 grams NTA trisodium salt and 30.9 grams water. The resulting mixture was stirred at 60° C. for 2 hours, and the layers were then allowed to separate. The decanted light phase was precipitated in methanol, filtered, reslurried in methanol, and filtered again. The copolymer was obtained as a dry powder after drying in a vacuum oven at 110° C.

Examples 2 and 3, and Comparative Examples 4-8

The general procedure of Comparative Example 3 was followed, except the mole ratios of copper to amine nitrogen to monomer and the polymerization temperatures were varied, Molecular weight, thermogravimetric analysis, and oxygen uptake data are provided in Tables 2-4, respectively. Mole percents of terminal OPP units are provided in Table 4.

However when the monomer to copper ratio is reduced to 30:1 to 100:1, as in Examples 1 and 3, and Comparative Examples 1-2 and 6-7, a Mw of at least 35,000 is obtained.

U.S. Patent Application Publication No. 2008/0076884 of Yeager et al. discloses a method for preparing poly(phenylene ether) copolymers comprising repeat units derived from 2,6-dimethylphenol and unsymmetrical 2,6-disubstituted phenols. The method utilizes a ratio of total moles of 2,6-dimethylphenol and unsymmetrical 2,6-disubstituted phenol to moles of catalyst metal ion of 1,480:1 in Preparative Examples 4-7. Using this amount of catalyst metal ion, weight average molecular weights of 29,480 to 89,705 atomic mass units were obtained. It has been found by the inventors that the weight average molecular weight of the poly(phenylene ether) copolymers is inversely proportional to the ratio of total moles monomer to moles metal ion, i.e. the higher the ratio, the lower the weight average molecular weight. With reference to Table 2, Examples 2, 1, and 3 had total moles monomer to moles metal ion ratios of 1,000:1, 100:1 and 48:1, respectively and weight average molecular weights of 8,200, 40,870, and 92,000 atomic mass units, respectively. Following this trend, if the ratio of monomers to metal ion in Example 1 were increased from 1,000:1 to 1,480:1, as taught by Yeager et al., a weight average molecular weight less than 8,000 would be obtained. Thus Yeager et al. does not provide

TABLE 2

Molecular weight data

| No. | OPP/DMP Mole Ratio | Catalyst Components | Cu:N:Monomer Mole Ratios | Poly. Temp. (° C.) | $M_n$ | $M_w$ | $D^1$ |
|---|---|---|---|---|---|---|---|
| Ex. 1 | 20/80 | TMED, DMBA/CuBr | 1:2:100 | 45 | 8,549 | 40,870 | 4.78 |
| C. Ex. 1 | 0/100 | DBA, DMBA, DBEDA/$Cu_2O$/HBr | 1:2.4:36 | 25 | 15,530 | 42,678 | 2.75 |
| C. Ex. 2 | 100/0 | TMPD, DMBA/CuBr | 1:2:100 | 45 | 4,579 | 16,069 | 3.51 |
| Ex. 2 | 20/80 | DBA, DMBA, DBEDA/$Cu_2O$/HBr | 1:2.4:1,000 | 30 | 4,200 | 8,200 | 1.95 |
| C. Ex. 4 | 50/50 | DBA, DMBA, DBEDA/$Cu_2O$/HBr | 1:2.4:900 | 30 | No powder isolated | | |
| C. Ex. 5 | 0/100 | DBA, DMBA, DBEDA/$Cu_2O$/HBr | — | — | 22,000 | 68,000 | 3.17 |
| Ex. 3 | 20/80 | DBA, DMBA, DBEDA/$Cu_2O$/HBr | 1:2.4:48 | 30 | 10,700 | 92,000 | 8.54 |
| C. Ex. 6 | 50/50 | DBA, DMBA, DBEDA/$Cu_2O$/HBr | 1:2.4:32 | 60 | 6,400 | 35,000 | 5.43 |
| C. Ex. 7 | 80/20 | DBA, DMBA, DBEDA/$Cu_2O$/HBr | 1:2.4:30 | 60 | 5,800 | 41,500 | 7.11 |
| C. Ex. 8 | 100/0 | DBA, DMBA, DBEDA/$Cu_2O$/HBr | 1:2.4:28 | 60 | 2,950 | 8,000 | 2.71 |

[1]Polydispersity index

It has been found that lower monomer to copper ratios than normally used for poly(phenylene ether) homopolymers are required to obtain high molecular weight copolymers of OPP and DMP. As can be seen from Example 2 and Comparative Example 4 in Table 2, when typical monomer to copper ratios of 1,000:1 and 900:1, respectively, are used, either no polymer is obtained (Comparative Example 4), or a low molecular weight polymer is obtained ($M_w$ of 8,200 for Example 2).

a viable method for preparing poly(phenylene ether) copolymers of 2-phenylphenol and 2,6-dimethylphenol having weight average molecular weights of 8,000 to 200,000 atomic mass units. Poly(phenylene ether) copolymers having a weight average molecular weight of less than 8,000 atomic mass units are not suitable for use in molding compositions.

Thermogravimetric analysis (TGA) data, which is a measure of thermal and oxidative stability, is provided in Table 3.

As can be seen from Table 3, residual weight at 600° C. in nitrogen increases with increasing OPP content in the copolymer. Thus the OPP monomer units provide enhanced thermal stability for the copolymer. The low residual weight in air for Example 3 can be due to the higher residual copper content (40.4 ppm), which can serve to catalyze oxidative decomposition of the poly(phenylene ether) copolymer.

TABLE 3

Thermogravimetric analysis data

| No. | OPP/DMP Mole Ratio | $M_w$ | T (° C.) @ 95% wt, Air | T (° C.) @ 95% wt, $N_2$ | Wt % @ 600° C., Air | Wt % @ 600° C., $N_2$ | Cu, ICP (ppm) |
|---|---|---|---|---|---|---|---|
| C. Ex. 5 | 0/100 | 68,000 | 472 | 464 | 50.9 | 32.5 | — |
| Ex. 3 | 20/80 | 92,000 | 464 | 448 | 40.9 | 37.5 | 40.4 |
| C. Ex. 6 | 50/50 | 35,000 | 452 | 432 | 53.6 | 38.1 | 14.1 |
| C. Ex. 7 | 80/20 | 41,500 | 452 | 432 | 64.5 | 47.5 | 21.5 |
| C. Ex. 8 | 100/0 | 8,000 | 372 | 392 | 66.4 | 47.5 | 3 |

It has surprisingly been found that the poly(phenylene ether) copolymers are enriched in 2-phenylphenol head units relative to the amount expected from the total amount of 2-phenylphenol repeat units in the poly(phenylene ether) copolymer. The overall mole percent of 2-phenylphenol in the poly(phenylene ether) copolymer and the mole percent of 2-phenylphenol head units for Examples 3 and Comparative Examples 6 and 7 were measured by Fourier transform infrared spectroscopy as described above. The results are provided in Table 4. As can be seen from Table 4, the mole percent of 2-phenylphenol head units is 39%, 52%, and 22% greater than the total mole percent of 2-phenylphenol repeat units in the poly(phenylene ether) copolymer overall, for Examples 3, Comparative Example 5, and Comparative Example 6, respectively.

TABLE 4

Composition of Head Units

| No. | OPP/DMP Mole Ratio | $M_w$ | Mole % OPP In Copolymer ($^1$H NMR) | Mole % OPP In Head Units (FTIR) | Mole % OPP in Head Units:Copolymer |
|---|---|---|---|---|---|
| Ex. 3 | 20/80 | 92,000 | 20.7 | 28.8 | 1.39:1 |
| C. Ex. 6 | 50/50 | 35,000 | 47 | 71.4 | 1.52:1 |
| C. Ex. 7 | 80/20 | 41,500 | 78.7 | 95.7 | 1.22:1 |

The incorporation of the OPP units into the copolymer and the absence of DMP homopolymer in the copolymers were verified by GPEC (Gradient Polymer Elution Chromatography). Chromatograms for the 20/80 copolymer of Example 1, the DMP homopolymer of Comparative Example 1, the OPP homopolymer of Comparative Example 2, and a 50/50 mole/mole mixture of Example 1 and Comparative Example 2 were obtained. FIG. 1 depicts the gradient partition elution chromatography chromatograms of Example 1 and Comparative Example 2, overlaid (FIG. 1a); of Comparative Example 2 and commercially available poly(2,6-dimethyl-1,4-phenylene ether), overlaid (FIG. 1b); and of a mixture of Example 1 and Comparative Example 1 (FIG. 1c). FIG. 1a exhibits a peak at about 9 minutes corresponding to the 20/80 copolymer of Example 1, and a peak at about 11 minutes corresponding to the OPP homopolymer of Comparative Example 2. FIG. 1b shows that the DMP homopolymer of Comparative Example 2 and commercial DMP homopolymer are essentially identical. FIG. 1c exhibits a peak at a retention time of about 9 minutes corresponding to the 20/80 copolymer of Example 1, and a peak at a retention time of about 21 minutes corresponding to the DMP homopolymer of Comparative Example 1. The absence of a peak at about 21 minutes in the chromatogram of FIG. 1a indicates the absence of DMP homopolymer in the 20/80 copolymer of Example 1. The absence of a peak at about 11.5 minutes in the chromatogram of FIG. 1c indicates the absence of OPP homopolymer in the 20/80 copolymer of Example 1. The absence of any amount of both the DMP and OPP homopolymers is surprising. The absence of DMP homopolymer is particularly surprising in view of the expected higher reactivity of DMP over OPP and the 4-fold excess of DMP over OPP in the polymerization monomer mixture.

Figure 2:
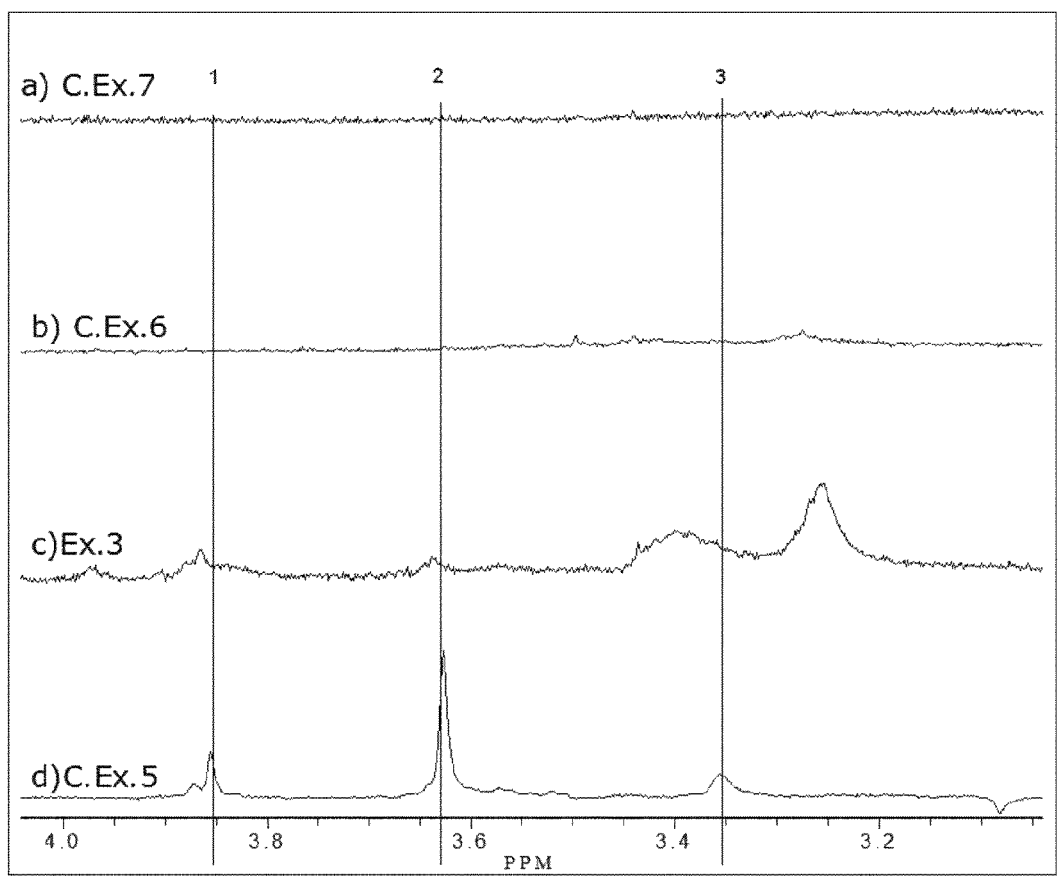
FIG. 2 depicts proton nuclear magnetic resonance ($^1$H NMR) spectra in the region from about 3.05 to about 4.05 parts per million for Comparative Example 7 (2a), Comparative Example 6 (2b), Example 3 (2c), and Comparative Example 5 (2d).

Some poly(phenylene ether) copolymers can have monoamine ligand incorporated into the polymer chains to a lesser extent than monoamine ligand is incorporated into DMP homopolymer chains. Poly(phenylene ether)s can comprise molecules having aminoalkyl-containing terminal unit(s) and/or internal unit(s). When the poly(phenylene ether) is a homopolymer or copolymer of 2,6-dimethylphenol, the aminoalkyl groups are aminomethyl groups located in a position ortho to the phenolic hydroxy group of terminal repeat units, and ortho to ether groups and meta to methyl groups in internal repeat units, and they are formed by reaction of a monoamine catalyst ligand with the ortho methyl groups of the poly(phenylene ether). FIG. 2 depicts the $^1$H NMR spectra in the region from about 3.05 to about 4.05 parts per million (relative to tetramethylsilane at 0 parts per million) for Comparative Example 7 (FIG. 2a), Comparative Example 6 (FIG. 2b), Example 3 (FIG. 2c), and Comparative Example 5 (FIG. 2d). Comparative Example 7 is an 80/20 OPP/DMP copolymer, Comparative Example 6 is a 50/50 OPP/DMP copolymer, Example 3 is a 20/80 OPP/DMP copolymer, and Comparative Example 5 is commercial poly (2,6-dimethyl-1,4-phenylene ether). Line 1, positioned at the chemical shift of 3.85 parts per million, line 2, positioned at a chemical shift of 3.63 parts per million, and line 3, positioned at a chemical shift of 3.36 parts per million, are all attributed to aminomethyl group protons in 2,6-dimethylphenol units. With reference to FIG. 2d (DMP homopolymer), the peaks at 3.36, 3.63, and 3.85 parts per million indicate the presence of aminomethyl groups. Based on integration of the peak areas, the total amount of aminomethyl groups is about 0.56 mole percent, based on a total of 100 mole percent of monomer repeat units. Now with reference to FIG. 2a (80/20 OPP/DMP copolymer) and 2b (50/50 OPP/DMP copolymer), there are no peaks at 3.36, 3.63, or 3.85 parts per million. Therefore these copolymers are essentially free of aminomethyl groups. With reference to FIG. 2c (20/80 OPP/DMP copolymer), the total peak area at 3.36, 3.63, and 3.85 parts per million for FIG. 2c is less than the total peak area for FIG. 2d. (The broad peak at about 3.40 parts per million in FIG. 2c is unassigned.) Therefore the inventive OPP/DMP copolymer has less incorporated amine as aminomethyl groups than the DMP homopolymer.

Figure 3:
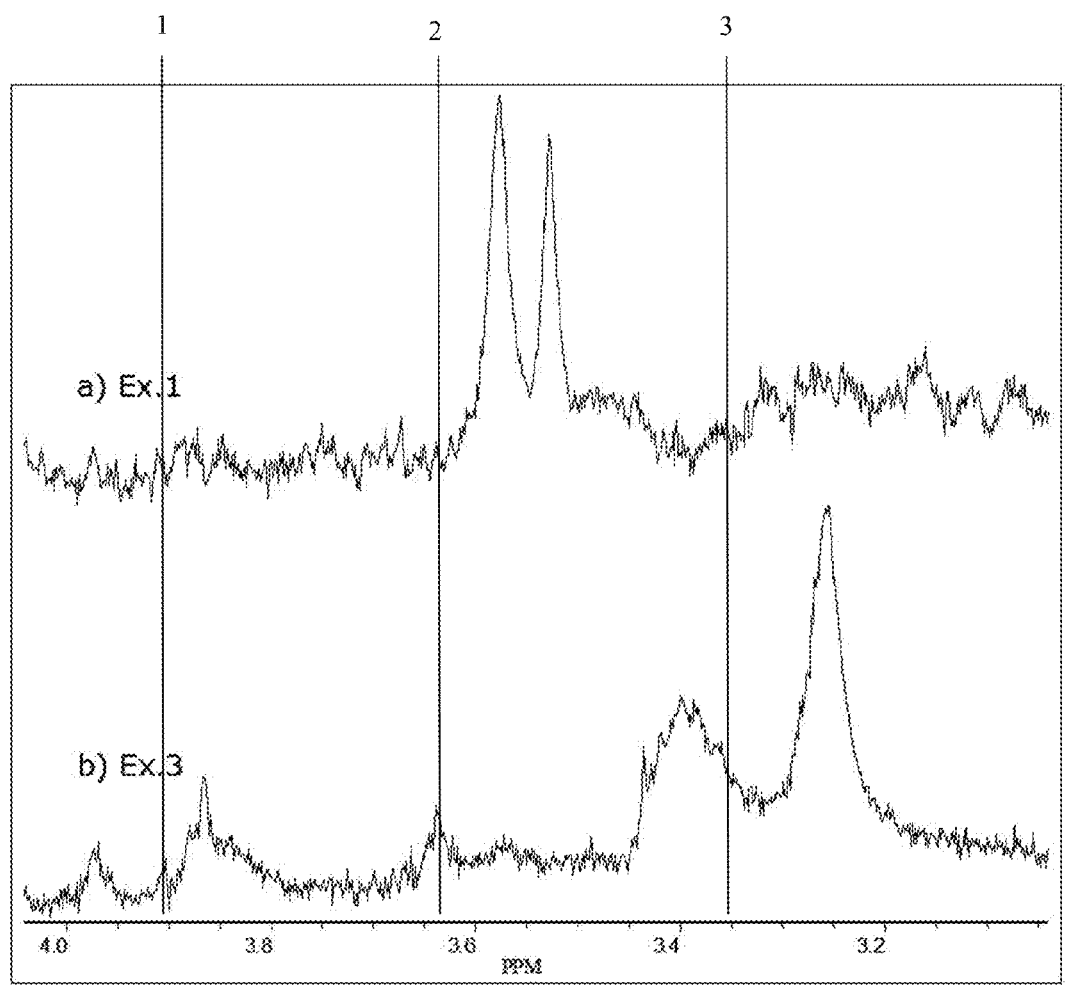
FIG. 3 depicts $^1$H NMR spectra in the region from about 3.05 to about 4.05 parts per million for Examples 1 (3a) and 3 (3b).

FIG. 3 depicts $^1$H NMR spectra for the 20/80 copolymers of Examples 1 (FIG. 3a) and 3 (FIG. 3b) in the chemical shift region of about 3.05 to about 4.05 parts per million, which is the region in which peaks for aminomethyl protons in poly(phenylene ether)s are found. With reference to FIG. 3a, there are no peaks at 3.36, 3.63, or 3.85 parts per million. Therefore Example 1 is essentially free of aminomethyl groups. With reference to FIG. 3b, the total peak area at 3.36, 3.63, and 3.85 parts per million (adjusted for the change in vertical scale) is less than the total peak area for FIG. 2d. (The broad peak at about 3.40 parts per million in FIG. 3b is unassigned.) Therefore the inventive OPP/DMP copolymer has either essentially no incorporated amine, or less incorporated amine, depending upon the amine ligands used in the preparation of the copolymer, than the DMP homopolymer.

Example 4

Figure 4:
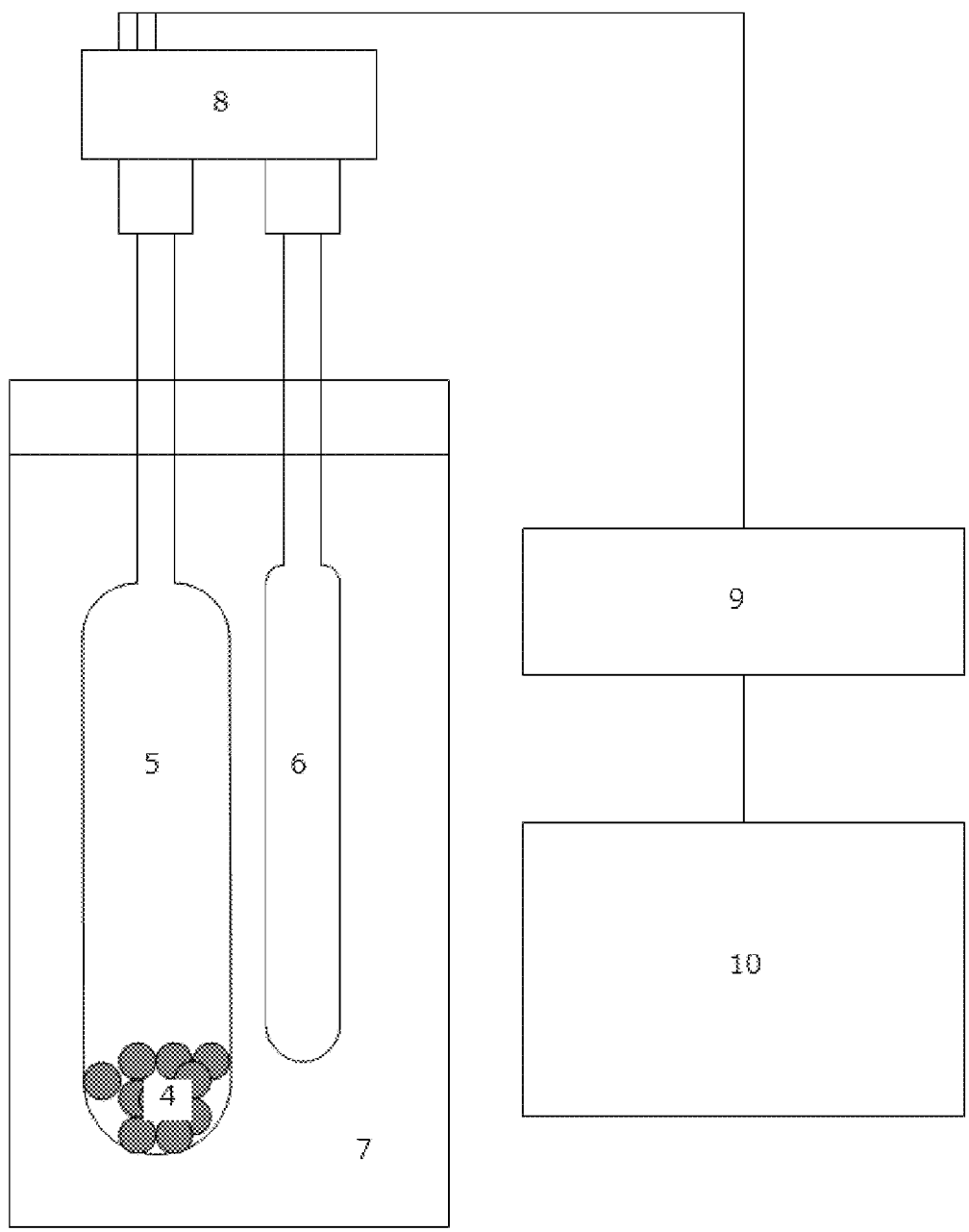
FIG. 4 is a schematic diagram of the oxygen uptake apparatus used in Example 4.

Oxidative resistance was measured by oxygen uptake at 120° C. A schematic diagram of the oxygen uptake apparatus used is depicted schematically in FIG. 4. The samples 4 were placed in PYREX vials 5 of known volume (about 30 milliliters). The vials were then flushed with oxygen for 60 seconds, then attached to a differential pressure transducer 8 (OMEGA 143PC05D), having an empty reference vial 6 attached. The vials were attached to the transducer using TYGON tubing. The sample vial 5 and reference vial 6 were placed in a silicone oil bath 7 maintained within 1° C. of the 120° C. set temperature by a J-KEM 9900 temperature controller. Up to sixteen transducers were powered by an 8 volt power supply (OMEGA PST-8). Every twenty minutes the voltages from the transducers were acquired using data acquisition system 9 (OMEGA OMB DAQ56 with OMB-PDQ1 expansion module), and sent to PC 10. The data was copied onto a MICROSOFT EXCEL spreadsheet using OMEGA PERSONAL DAQVIEW PLUS software installed on PC 10. The raw voltage data was then converted to oxygen consumption data using the gas law equation knowing the psi/volt factor of the transducer, the net volume of the vial, and the temperatures of the experiment.

Figure 5:
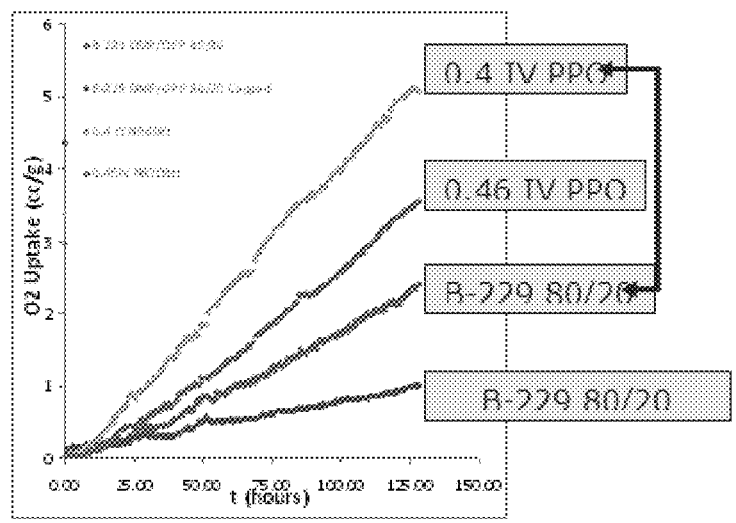
FIG. 5 depicts oxygen uptake rate—oxygen uptake amount as a function of time for DMP homopolymers, for a 20/80 OPP/DMP copolymer, and for a 20/80 OPP/DMP copolymer endcapped with acetic anhydride.

Oxygen uptake measurements were conducted on PPE homopolymers having intrinsic viscosities of 0.4 and 0.46 deciliters per gram, on a 20/80 OPP/DMP copolymer having an intrinsic viscosity of 0.4 deciliters per gram, and on 20/80 OPP/DMP copolymer endcapped with acetic anhydride. The results are plotted in FIG. 5. The 20/80 OPP/DMP copolymer was prepared by the same general procedure as Comparative Example 3, except the molar amounts of OPP and DMP were changed to 20 and 80 mole percent, respectively. Comparison of the oxygen uptake curves for the 0.4 IV DMP homopolymer and the 0.4 IV 20/80 OPP/DMP copolymer, which had the same intrinsic viscosity of 0.4 deciliters per gram, shows that incorporation of only 20 mole percent OPP into PPE backbone reduces the rate of oxygen uptake significantly. It was surprising that this relatively small amount of OPP content in the poly(phenylene ether) copolymer would provide an advantageous reduction in oxygen uptake rate, and therefore oxidative stability. Moreover, with only 20 mole percent of OPP, the 20/80 OPP/DMP copolymer provides a significant cost advantage over copolymers having higher levels of OPP content. As can be seen from FIG. 5, endcapping of the 20/80 OPP/DMP copolymer with acetic anhydride further reduces the rate of oxygen uptake.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A poly(phenylene ether) copolymer comprising about 5 to 40 mole percent repeat units derived from 2-phenylphenol and 60 to about 95 mole percent repeat units derived from 2,6-dimethylphenol, wherein the poly(phenylene ether) copolymer has a weight average molecular weight of 8,000 to about 200,000 atomic mass units, as measured by gel permeation chromatography; and wherein the poly(phenylene ether) copolymer comprises:

a mole percent of 2-phenylphenol head units based on 100 mole percent total 2-phenylphenol head units and 2,6-dimethylphenol head units, and a total mole percent of 2-phenylphenol repeat units, based on 100 mole percent total 2-phenylphenol repeat units and 2,6-dimethylphenol repeat units, wherein the mole percent of 2-phenylphenol head units is greater than the total mole percent of 2-phenylphenol repeat units; and wherein the poly(phenylene ether) copolymer is prepared by a process comprising:

oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst comprising a metal ion and at least one amine ligand to form a solution of the poly(phenylene ether) copolymer in the solvent, wherein a ratio of total moles of 2-phenylphenol and 2,6-dimethylphenol to moles of metal ion is about 20:1 to about 200:1; and wherein a ratio of moles of amine groups in the amine ligands to moles metal ion is about 1:1 to about 5:1.

2. The poly(phenylene ether) copolymer of claim 1, wherein the repeat units derived from 2-phenylphenol have the structure

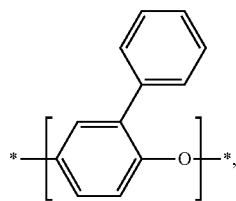

-continued

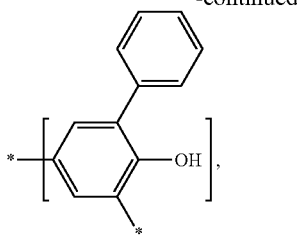

or
a combination thereof; and
the repeat units derived from 2,6-dimethylphenol comprise repeat units having the structure

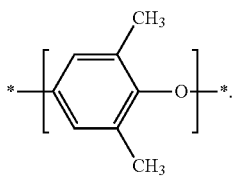

3. The poly(phenylene ether) copolymer of claim 1, wherein a ratio of mole percent of 2-phenylphenol head units to total mole percent of 2-phenylphenol repeat units is about 1.1:1 to about 2:1.

4. The poly(phenylene ether) copolymer of claim 1, wherein the repeat units derived from 2-phenylphenol have the structure

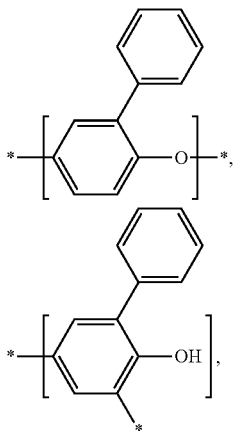

or
a combination thereof;
wherein the repeat units derived from 2,6-dimethylphenol comprise repeat units have the structure

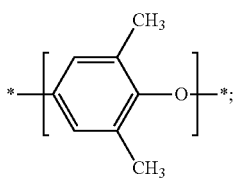

wherein the poly(phenylene ether) copolymer comprises
a mole percent of 2-phenylphenol head units based on 100 mole percent total 2-phenylphenol head units and 2,6-dimethylphenol head units,
a total mole percent of 2-phenylphenol repeat units, based on 100 mole percent total 2-phenylphenol and 2,6-dimethylphenol repeat units, and
a ratio of the mole percent of 2-phenylphenol head units to the total mole percent of 2-phenylphenol repeat units of about 1.1:1 to about 2:1; and
wherein the copolymer has a weight average molecular weight of about 20,000 to about 200,000 atomic mass units, as measured by gel permeation chromatography.

5. A method of preparing a poly(phenylene ether) copolymer comprising about 5 to 40 mole percent repeat units derived from 2-phenylphenol and 60 to about 95 mole percent repeat units derived from 2,6-dimethylphenol,
wherein the poly(phenylene ether) copolymer has a weight average molecular weight of 8,000 to about 200,000 atomic mass units, as measured by gel permeation chromatography; and
wherein the poly(phenylene ether) copolymer comprises:
a mole percent of 2-phenylphenol head units based on 100 mole percent total 2-phenylphenol head units and 2,6-dimethylphenol head units, and
a total mole percent of 2-phenylphenol repeat units, based on 100 mole percent total 2-phenylphenol repeat units and 2,6-dimethylphenol repeat units,
wherein the mole percent of 2-phenylphenol head units is greater than the total mole percent of 2-phenylphenol repeat units,
the method comprising oxidatively copolymerizing a monomer mixture comprising about 5 to 40 mole percent 2-phenylphenol and about 60 to about 95 mole percent 2,6-dimethylphenol in the presence of a solvent, molecular oxygen, and a polymerization catalyst comprising a metal ion and at least one amine ligand to form a solution of the poly(phenylene ether) copolymer in the solvent,
wherein a ratio of total moles of 2-phenylphenol and 2,6-dimethylphenol to moles of metal ion is about 20:1 to about 200:1; and
wherein a ratio of moles of amine groups in the amine ligands to moles metal ion is about 1:1 to about 5:1.

6. The method of claim 5, further comprising
mixing the solution of the poly(phenylene ether) copolymer in the solvent with an aqueous solution of a chelating agent, and
separating the solution of the poly(phenylene ether) copolymer from the aqueous solution of the chelating agent.

7. The method of claim 6, further comprising precipitating the poly(phenylene ether) copolymer by combining an antisolvent with the separated solution of the poly(phenylene ether) copolymer in the solvent.

8. The method of claim 6, further comprising removing the solvent from the separated solution of the poly(phenylene ether) copolymer by devolatizing extrusion.

* * * * *